May 20, 1952  F. A. MARTIN  2,597,806
SUCTION CLEANER HOSE
Filed Oct. 30, 1946

INVENTOR.
Frank A. Martin
BY Harry S. Dumarr
ATTORNEY.

Patented May 20, 1952

2,597,806

UNITED STATES PATENT OFFICE 2,597,806

SUCTION CLEANER HOSE

Frank A. Martin, Akron, Ohio, assignor to The Hoover Company, North Canton, Ohio, a corporation of Ohio Application October 30, 1946, Serial No. 706,785

5 Claims. (Cl. 138—56)

This invention relates to flexible hose and more particularly to a flexible hose adapted for use with suction cleaners either with converter attachments for the "on-the-floor" type cleaners or with the so-called "tank" or "canister" type cleaners.

There is a special problem in constructing flexible hose for use with suction cleaners. The hose must be light in weight with very flexible walls so as to be easily manipulated by the housewife when in use. In contra-distinction to that, the walls must be strong so as not to be crushed by being trod upon while being used.

According to this invention, the hose carcass is made very thin with a stiff steel helical wire formed as an integral part of the carcass so that when the hose is trod upon or otherwise subjected to local pressure on the outside, the wire will withstand direct compression and will be held by the carcass from being canted out of normal position and being torn loose from the carcass walls.

A thin fabric covering over the helical wire is pulled into close contact with the wires by a cord wound helically over the thin wall of fabric between the convolutions of wire and the entire assembly is vulcanized so as to form a unitary carcass.

Over the carcass is placed a thin covering of an elastic material which will place an elastic compression on the carcass walls so as to be tightly adherent to the carcass walls but being otherwise unadhered thereto. This serves to make the hose comparatively rigid insofar as the direct compression is concerned without in any way interfering with its flexibility. When the hose is bent rather sharply, it has been found that the elastic covering will bend away from the carcass walls in folds on the inside of the bend while on the outside the material will readily stretch.

The material used is preferably an elastic thermoplastic such as a polyvinyl chloride commonly known in the trade as "vinylite." This covering may be applied by extrusion or by expanding a pre-formed tube of the material over the carcass. In the former process the extruding die is made only slightly larger than the exterior diameter of the carcass so that when the tube cools as it issues from the extrusion die it will contract against the outer surface of the carcass, but will not be bonded thereto. In the latter process the tube is pre-formed, air pressure is applied to the tube interiorly by a mechanism which will permit the carcass to be inserted into the tube while it is in expanded condition. The pressure is then released allowing the tubes to contract about the carcass.

It has been found that the walls of the tube need only be a few thousandths of an inch thick. From 0.015 to 0.025 inch in thickness has been found suitable.

According to another feature of this invention, the fabric forming the covering for the helical wire and the cord with which the carcass covering is wrapped may be made of different colors and the elastic covering may be made transparent so that the variegated pattern formed may be readily visible so as to present a pleasing appearance.

The covering for the helical wire is preferably made of frictioned duck or frictioned tape suitably rubberized so that it will be vulcanized to the helical wire and the wrapping cord upon the application of heat prior to the assembly of the elastic covering.

The wire is wound helically on a mandrel and the ends held thereto in any suitable manner. The covering of frictioned duck or frictioned tape is then applied. If frictioned duck is used it is rubberized on both sides and wrapped about the mandrel and overlapped in a substantially horizontal lap joint. The overlapped edges may be cemented to hold the wrapping in place during the remainder of the assembly operation. If frictioned tape is used, it may be wrapped spirally over the mandrel and wire with the edges of the tape slightly overlapped and the free end attached to the mandrel in any suitable manner so as to hold the covering assembled.

In any case the frictioned duck or frictioned tape forms the impervious wall of the tube carcass.

After the duck or tape is applied, a hemp or other cord is wrapped spirally about the mandrel, over the duck or tape covering, with the convolutions lying between the convolutions of the wire so as to draw the duck or tape downwardly between the convolutions of the wire into firm contact with the mandrel and about the wire so as to form a substantially smooth inner surface.

The carcass thus formed is then subjected to a vulcanizing process while remaining on the mandrel. It has been found that a carcass thus made can be formed into an integral body with a minimum of vulcanizing heat.

After the carcass is vulcanized an outer elastic covering is applied as previously explained and the hose removed from the mandrel. When the mandrel is removed the wire tends to expand against the elastic compression of the covering which further augments the compressive strength of the hose against crushing stresses.

According to a modification, the interior of the hose may be lined with an extruded thermoplastic tube which may be of the same material as the elastic covering.

A pre-formed tube of polyvinyl chloride or acetate about 0.010 to 0.015 inch in thickness is applied to a mandrel and the wire applied to the exterior of the tube. The wire is forced into the material of the tube by the tendency of the wire to contract and by the application of heat if necessary. The remainder of the hose is formed as before.

If desired, the wire may be pre-formed on a smaller mandrel so as to be of the same size as the diameter of the final mandrel.

Other objects and advantages of this invention will become apparent as the description proceeds when taken in connection with the accompanying drawings, in which.

Figure 1:
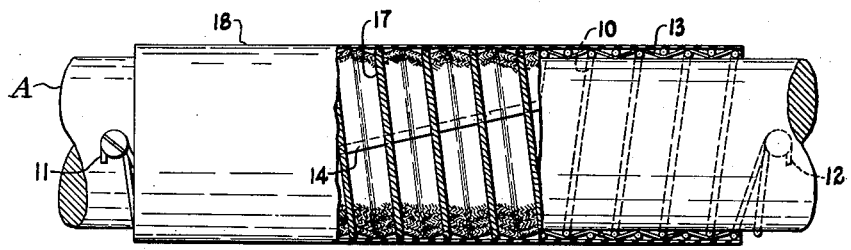
Figure 1 is a cross-sectional view of a flexible hose made according to this invention shown in position on a forming mandrel.

Referring to the drawings, A represents a mandrel upon which the hose is formed. Upon the outer surface of the mandrel A a spring steel wire 10 is helically wrapped. For a hose of one and one-half inch internal diameter it has been found that the convolutions of the wire may be spaced apart from three-eighths to one-half inch. The diameter of the wire may vary with its physical properties, but is preferably of spring steel of from 0.030 to 0.040 inch in diameter.

In winding the wire 10 on the mandrel A, one end 11 is secured to the mandrel in any suitable manner, the winding operation performed by hand, in a lathe or by means of a special winding machine and the other end 12 of the wire 10 also secured to the mandrel A.

Figure 3:
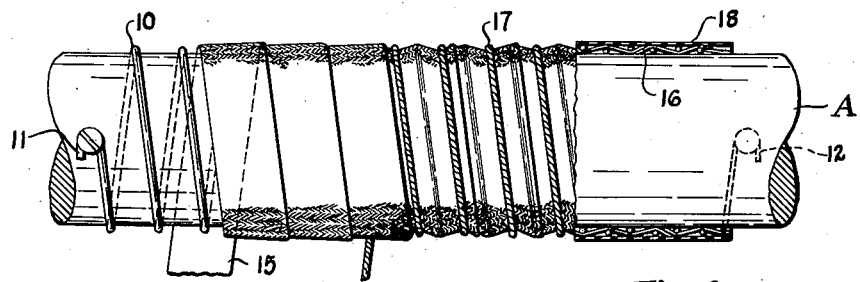
Figure 3 shows a modification similar to Figure 1 with the covering for the helical wire wrapped spirally.

Over the wire 10 and the mandrel A is placed a covering of rubberized duck or frictioned tape. In Figure 1 a layer 13 of rubberized duck is applied having overlapping edges cemented together as shown at 14. In Figure 3, a frictioned tape 15 is shown wound spirally over the wire 10 and mandrel A with its edges overlapped as shown at 16. The width of the tape is preferably such as to span at least two of the convolutions of the wire 10.

Over the duck 13 or tape 15 as the case may be is spirally wound a cord 17 of hemp or other material so as to draw the material of the duck or tape about the convolutions of the wire 10 and against the mandrel A so as to form an inner surface of substantially uniform diameter. Both ends of the cord 17 may be secured to the mandrel in any suitable manner to hold it in assembled relationship.

The entire assembly including the mandrel A and the hose carcass formed by the wire 10, duck 13 or tape 15 and cord 17 is subjected to a vulcanizing process so that the duck 13 or tape 15 will adhere to both the wire 10 and the cord 17 so as to form an integral structure.

An elastic covering 18 is then applied to the outer surface of the hose carcass so as to apply an elastic compression to the exterior surface of the carcass toward its center.

The covering 18 is preferably made of a thermoplastic material which is comparatively stiff at normal temperatures but is elastic in that it can be stretched and will return to its original position when the stretching force is released. Such a material is available on the market under the trade name of "vinylite" which is composed of a polyvinyl chloride or acetate. This material readily lends itself to the extrusion process and its thermoplastic at comparatively low temperatures.

The covering 18 may be applied directly to the carcass by the extrusion process. In that case the extrusion die is made only slightly larger in diameter than the diameter of the carcass so that as the covering 18 issues from the die in a hot state it will contract about the carcass upon cooling so as to tightly adhere thereto and apply an elastic compression to the carcass but will be otherwise unbonded thereto.

Another method of applying the covering 18 is as follows: A tube of the thermoplastic material is extruded so that its inner diameter will be less than the outer diameter of the carcass. The tube is then expanded by the application of air pressure to the interior of the tube so that the inner diameter of the tube is greater than the exterior diameter of the carcass. This may be done by any suitable mechanism known in the art which will permit the mandrel A and the carcass to be inserted into the expanded tube while the interior pressure is maintained thereon. The pressure is then released causing the expanded tube to contract about the body of the carcass and thus apply an elastic compression thereto.

After the covering 18 has been applied by either of the foregoing methods, the mandrel A is removed in any suitable manner. The removal of the securing means for the ends 11 and 12 of the wire 10 will cause it to expand slightly so as to force the fabric 13 or 15 outwardly against the elastic covering 18.

Figure 2:
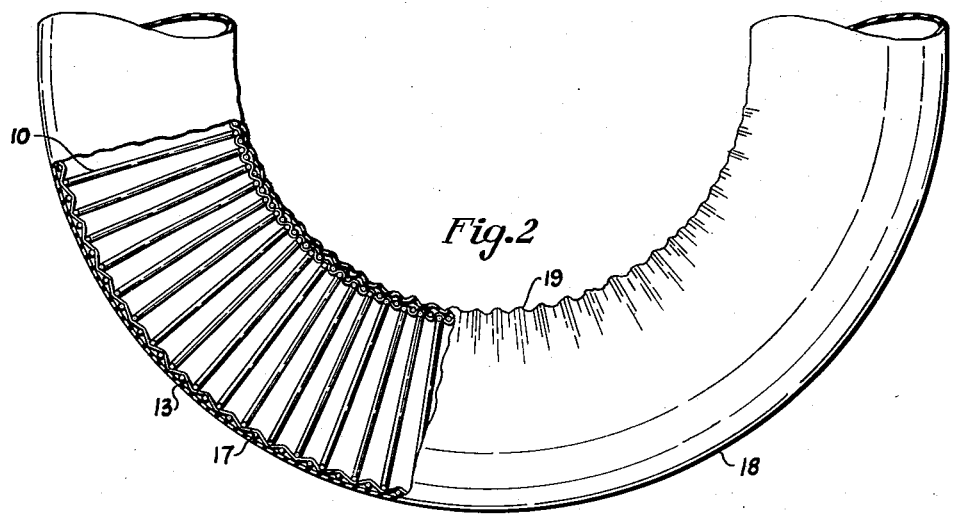
Figure 2 shows how a hose made according to this invention acts when bent sharply.

Regardless as to how the covering 18 is applied, the elastic compression applied to the carcass will normally prevent the convolutions of wire from moving toward each other so that the tube will be rigid longitudinally but when the tube is bent sharply the elastic covering on the inside will bend away from the carcass in folds as shown at 19 in Figure 2 and the material of the covering 18 on the exterior of the curve will stretch.

Thus, according to this invention, a suction cleaner hose is formed with a very thin light wall which is normally fairly rigid and has very high strength against exterior compressive forces but which is very flexible when a bending stress is applied.

"Vinylite" is normally transparent but may be colored to any suitable color by the mixing of a suitable pigment with the material prior to the extrusion process. However, according to this invention, it is preferable to leave the "vinylite" in its normal transparent state and to make the outer surface of the hose carcass of varying colors so as to be visible through the transparent covering 18 and present a pleasing appearance. For example, the fabric 13 or 15 as the case may be may be made of one color and the cord 17 of another or the fabric alone may be woven with different colored threads so as to present a variegated appearance.

Some times it is desirable to form a suction cleaner hose with a very smooth interior surface.

Figure 4:
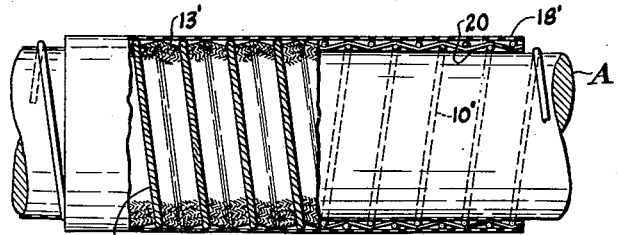
Figure 4 shows a modification of the hose according to this invention with a thermoplastic lining.

Such a construction is shown in Figure 4. A preformed tube 20 of a thermoplastic material, which may be "vinylite" is assembled over the mandrel A. The tube 20 should be very thin and may be in the order of from 0.010 to 0.015 inch in thickness.

The wire 10' is then wound on a mandrel smaller than the mandrel A so that when it is released its interior diameter will be substantially the same as the exterior diameter of the mandrel A. The wire 10' may then be assembled over the tube 20 by twisting it reversely so it will expand sufficiently to be slid over the tube 20. The twisting pressure may then be released allowing the wire 10' to contract into the surface of the tube 20.

The assembly thus formed may then be subjected to heat sufficiently to allow the wire 10' to contract into contact with the mandrel and to permit the material of the tube 20 to flow about the wire 10' except for its outer periphery which will project beyond the outer surface of the tube 20. The assembly thus formed is then allowed to cool and the remaining parts of the tube constituted by the fabric 13', cord 17' and elastic covering 18' are applied as in the other modifications.

The resulting structure will comprise a hose having very thin walls with a smooth interior surface which is normally comparatively rigid and extremely strong against external pressure but which is extremely flexible when a transverse bending stress is applied.

While I have shown but a number of modifications of my invention it is to be understood that these modifications are to be taken as illustrative only and not in a limiting sense. I do not wish to be limited to the particular structure shown and described but to include all equivalent variations except as limited by the scope of the claims.

I claim:

1. A flexible hose for suction cleaners consisting of, a stiff steel wire of cylindrical helical form, a layer of frictioned fabric covering said helical wire, a spirally wound cord having its convolutions lying between the convolutions of said helical wire and pressing said fabric between the convolutions of said wire so as to form an interior surface of substantially the same diameter throughout the length of the hose, said fabric being bonded to both said wire and cord so as to form an impervious integral hose carcass which maintains its shape even though bent sharply and an elastic thermoplastic covering applied to said carcass, said covering having a normal internal diameter less than the external diameter of said carcass and being unbonded thereto so as to apply an elastic compression to said carcass and normally tightly adhering thereto but being capable of moving away therefrom into folds on the inside of the curve when the hose is bent sharply and of being stretched on the outside of the curve.

2. A flexible hose consisting of, a stiff steel wire of cylindrical helical form, a layer of variegated frictioned fabric covering said helical wire, a spirally wound cord having its convolutions lying between the convolutions of said helical wire and pressing said fabric between the convolutions of said wire so as to form an interior surface of substantially the same diameter throughout the length of the hose, said fabric being bonded to both said wire and cord so as to form an impervious integral hose carcass which maintains its cylindrical shape even though bent sharply and an elastic transparent thermoplastic covering applied to said carcass, said covering having a normal internal diameter less than the external diameter of said carcass and being unbonded thereto so as to apply an elastic compression to said carcass and normally tightly adhering thereto but being capable of moving away therefrom into folds on the inside of the curve when the hose is bent sharply and of being stretched on the outside of the curve.

3. A flexible hose consisting of, a stiff steel wire of cylindrical helical form, a layer of frictioned fabric covering said helical wire, a spirally wound cord having its convolutions lying between the convolutions of said helical wire and pressing said fabric between the convolutions of said wire so as to form an interior surface of substantially the same diameter throughout the length of the hose, said spirally wound cord being of a different color than said fabric so as to present a pleasing appearance, said fabric being bonded to both said wire and cord so as to form an impervious integral hose carcass which maintains its shape even though bent sharply and an elastic transparent thermoplastic covering applied to said carcass, said covering having a normal interior diameter less than the exterior diameter of said carcass and being unbonded thereto so as to apply an elastic compression to said carcass and normally tightly adhering thereto but being capable of moving away therefrom into folds upon the inside of the curve when the hose is bent sharply and of being stretched on the outside of said curve.

4. A flexible hose for a suction cleaner comprising, a stiff steel wire of a cylindrical helical form, a layer of frictioned fabric covering said helical wire, a spirally wound cord having its convolutions lying between the convolutions of said helical wire and pressing said fabric between the convolutions of said wire so as to form an interior surface of substantially the same diameter throughout the length of the hose, said fabric being bonded to both said wire and cord so as to form an impervious integral hose carcass which maintains its shape even though bent sharply and an elastic polyvinyl acetate covering applied to said carcass, said covering having a normal internal diameter less than the external diameter of said carcass and being unbonded thereto so as to apply an elastic compression to said carcass and normally tightly adhering thereto but being capable of moving away from said carcass into folds on the inside of the curve when the hose is bent sharply and of being stretched on the outside of the curve.

5. A flexible hose consisting of, an interior lining in the form of a thin tube of a flexible plastic which is thermoplastic at a comparatively low temperature, a stiff steel helical wire having its convolutions at least partly embedded in the walls of said tube, a layer of rubberized fabric covering said tube and helical wire, a spirally wound cord having its convolutions lying between the convolutions of said helical wire and pressing said fabric covering between the protruding edges of said wire convolutions and against the outer surface of said tube, said fabric covering being bonded to said tube and said wire on one side and to said cord on the other side to form a thin impervious integral hose carcass which maintains its cylindrical shape even though bent sharply and an elastic thermoplastic covering applied to said carcass, said covering having a normal internal diameter less than the external diameter of said carcass and being unbonded thereto so as to apply an elastic compression to said carcass and normally tightly adhering thereto but being capable of moving away from said carcass into folds on the inside of the curve when the tube is bent sharply and of being stretched on the outside of the curve.

FRANK A. MARTIN.

REFERENCES CITED

The following references are of record in the file of this patent:

UNITED STATES PATENTS

| Number | Name | Date |
| --- | --- | --- |
| 2,176,762 | Forbes | Oct. 17, 1939 |
| 2,262,861 | Rugeley et al. | Nov. 18, 1941 |
| 2,321,064 | Broedling | June 8, 1943 |
| 2,430,081 | Roberts et al. | Nov. 4, 1947 |
| 2,498,357 | Breisch | Feb. 21, 1950 |